(12) United States Patent
Hubert et al.

(10) Patent No.: US 9,889,907 B2
(45) Date of Patent: Feb. 13, 2018

(54) QUICK MOUNT CABLE-PROTECTING DEVICE USABLE IN MARINE SURVEYS

(71) Applicant: CGG SERVICES SA, Massy (FR)

(72) Inventors: Jean-Baptiste Hubert, Quimper (FR); Herve Richer De Forges, Versailles (FR); François Poisson, Saint Andre Goule D'Oie (FR); Thomas Pean, Nantes (FR); Florian Josse, Lorient (FR); Marie-fleur Sacreste, La Rochelle (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/968,970

(22) Filed: Dec. 15, 2015

(65) Prior Publication Data

US 2016/0280334 A1    Sep. 29, 2016

Related U.S. Application Data

(60) Provisional application No. 62/138,559, filed on Mar. 26, 2015.

(51) Int. Cl.
*B63B 21/66* (2006.01)
*G01V 1/20* (2006.01)
(Continued)

(52) U.S. Cl.
CPC ............... *B63B 21/66* (2013.01); *F16L 1/23* (2013.01); *F16L 57/02* (2013.01); *G01V 1/202* (2013.01); *G01V 1/3843* (2013.01)

(58) Field of Classification Search
CPC . B63B 21/66; B63B 21/663; B63B 2021/666; G01V 1/168; G01V 1/186;
(Continued)

(56) References Cited

U.S. PATENT DOCUMENTS 2,722,393 A    11/1955  Peterson
3,812,455 A *   5/1974  Pearson ................. G01V 1/201
                                                          367/154
(Continued)

FOREIGN PATENT DOCUMENTS

FR          864361        4/1941
GB          2413219 A    10/2005
(Continued)

OTHER PUBLICATIONS

Extended European Search Report in corresponding European Application No. EP 15 30 7001 dated Nov. 25, 2016.
(Continued)

*Primary Examiner* — Ajay Vasudeva
(74) *Attorney, Agent, or Firm* — Patent Portfolio Builders PLLC

(57) ABSTRACT

A cable-protecting device is used on a cable of a marine survey system to oppose cable bending and/or to limit a bending radius of the cable. The cable-protecting device has a functional body made of at least two portions configured to be clamped together to surround the cable, a gripping system configured to oppose the functional body sliding along the cable, and a closing system configured enable the at least two portions to engage fast and remain clamped.

19 Claims, 17 Drawing Sheets

(51) Int. Cl.
*G01V 1/38* (2006.01)
*F16L 1/23* (2006.01)
*F16L 57/02* (2006.01)

(58) Field of Classification Search
CPC .............. G01V 1/202; G01V 2001/204; G01V 2001/207; G01V 1/38; G01V 1/3808; G01V 1/3817; G01V 1/3826; G01V 1/3835; G01V 1/3843; G01V 1/3852; G01V 1/3861; G01V 1/387; G01V 1/393; F16L 1/20; F16L 1/225; F16L 1/23; F16L 1/235; F16L 57/00; F16L 57/02
See application file for complete search history.

(56) References Cited

U.S. PATENT DOCUMENTS

| | | | |
|---|---|---|---|
| 4,395,802 A | | 8/1983 | Albert, Jr. |
| 4,647,255 A | * | 3/1987 | Pow .................. B21D 9/03 405/168.1 |
| 5,575,590 A | * | 11/1996 | Drost ................... F16L 1/163 405/166 |
| 5,909,007 A | | 6/1999 | Norholmen |
| 6,010,273 A | | 1/2000 | Metzler, Jr. |
| 6,030,145 A | * | 2/2000 | Stewart, Jr. ........... E21B 17/015 405/171 |
| 6,039,081 A | | 3/2000 | Albert |
| 6,270,387 B1 | * | 8/2001 | Nesheim ............... E21B 17/012 405/211 |
| 6,758,157 B2 | * | 7/2004 | Grieger ................. B63B 21/663 114/244 |
| 7,469,722 B2 | * | 12/2008 | Berland ............... H01R 13/562 138/110 |
| 2003/0226488 A1 | | 12/2003 | Greiger et al. |
| 2010/0170428 A1 | | 7/2010 | Toennessen |
| 2010/0228295 A1 | | 9/2010 | Whitefield |
| 2011/0094748 A1 | | 4/2011 | Reddy |
| 2012/0304447 A1 | | 12/2012 | Smith et al. |
| 2013/0023131 A1 | | 1/2013 | Richer De Forges et al. |
| 2014/0334255 A1 | | 11/2014 | Sacreste et al. |
| 2015/0020726 A1 | | 1/2015 | McLemore et al. |
| 2016/0186893 A1 | * | 6/2016 | Nakovski ................ F16L 57/02 138/110 |

FOREIGN PATENT DOCUMENTS

| | | |
|---|---|---|
| WO | 2011/096820 A2 | 8/2011 |
| WO | 2013035078 A2 | 3/2013 |
| WO | 2014/071305 A2 | 5/2014 |

OTHER PUBLICATIONS

Partial European Search Report in corresponding European Application No. EP 15 30 7001 dated Aug. 12, 2016.
Extended European Search Report in corresponding European Application No. EP 17 17 8540 dated Sep. 18, 2017.

* cited by examiner

QUICK MOUNT CABLE-PROTECTING DEVICE USABLE IN MARINE SURVEYS

CROSS REFERENCE TO RELATED APPLICATIONS

This application claims priority and benefit from U.S. Provisional Patent Application No. 62/138,559, filed on Mar. 26, 2015, for "Quick Mount Bend Restrictor Assembly," the content of which is incorporated in its entirety herein by reference.

BACKGROUND

Technical Field

Embodiments of the subject matter disclosed herein generally relate to a cable-protecting devices (bend restrictors and/or bend stiffeners) used in marine systems, the cable-protecting devices being configured to ensure quick mounting on a cable.

Discussion of the Background

Marine surveys are methods used for geophysical prospecting, in particular, when seeking gas and oil reservoirs. Such surveys gather information about sedimentary rock formations using seismic signals. The signals are reflected, refracted and/or transmitted at interfaces in the surveyed geological formation where the signal's propagation velocity changes. Signals emerging from the explored geological formation are detected by receivers.

FIG. 1 represents an aerial view of a marine seismic survey system 100. This system is generic in terms of arrangement and equipment, not intended to be limiting. System 100 includes a vessel 110 towing a source 120 made of plural gun source-arrays and a streamer spread (only one streamer being labeled 130), along a sail line S.

In order to tow the source and the streamer spread according to a predetermined data-acquisition geometry, a set of cables connect various pieces of equipment to vessel 110. In this document, the term "cable" encompasses various types of cables from simple ropes or chains to complex structures able to transmit power, pressured fluid, signals and to convey the strength necessary for towing. The set of cables (only some labeled) includes streamer lead-in cables 140 connecting the streamers to the vessel, umbilical cables 150 (only one labeled) connecting source arrays to the vessel, two wide ropes 160 connecting deflectors 170, respectively, to the vessel. Further, cross-line distance ropes 180 limit distances between heads of adjacent streamers, and spur lines 185 limit distances between the left-most and the right-most streamer and the corresponding left-side and right-side deflector. Floats 190 are tied to streamer heads with link ropes (not labeled).

Bend restrictors and/or bend stiffeners are used to limit bending of cables (such as lead-in or umbilical cables) at places where undesirable bending forces often occur. Such places (e.g., A and B in FIG. 1) are where other cables (e.g., cross-line distance ropes, spur lines, cables attaching a float or a depressor, etc.) or equipment is attached to a cable. In these places, the cables are reinforced by bend restrictors and/or bend stiffeners to alleviate the inherent shear and tear. The term "bend stiffener" usually refers in particular to a device is configured to oppose cable bending, while the term "bend restrictor" usually refers to a device configured to limit the bending radius of the cable. In this document, the term "cable-protecting device" encompasses both "bend restrictor" and "bend stiffener."

Conventionally, helical rods surrounding the cable are used as bend stiffeners. Some bend stiffeners use plural layers. FIG. 2 illustrates a conventional bend stiffener 200, whose main body 210 protects cable 220's integrity, at a cable attachment location (see collar 230 provided for attaching another cable). Main body 210 is split in two parts closed with screws 240 (only few labeled), designed to ensure bend stiffener's grip on the cable and its mechanical properties. Tightening all the screws when mounting this bend stiffener for deployment, and then, removing them after cable's recovery, takes a substantial amount of time.

FIG. 3 illustrates a conventional bend restrictor 300, including plural knuckles 310, 320, . . . , 380 that form a "vertebrae" along cable 390. Collar 395 for attaching chains is mounted over knuckle 350. The knuckles have wider diameters than portions there-between, such as 315 and 325. Cable 390's bending radius is limited by the distance between these sectors. The knuckles are also mounted using screws 305 (only few labeled) and thus the mounting time is substantial.

A recurring problem with conventional bend restrictors and stiffeners is the long time necessary to mount these protective devices on the cables when the equipment is deployed. For example, it takes between 40 min and 2 h to mount a conventional bend restrictor (such as the one in FIG. 2) on a lead-in cable. Several deflectors have to be mounted and removed over bend restrictors at each deployment and recovery of the survey equipment. Additionally, as streamer spreads become wider, mechanical properties of bend stiffeners and/or restrictors need to be improved.

Accordingly, it is desirable to develop bend restrictors and/or stiffeners able to be quickly mounted and to have enhanced mechanical properties.

SUMMARY

A cable-protecting device used on a cable of a marine survey system has a functional body including two portions configured to be clamped around the cable. A closing system enabling the portions to engage fast and remain clamped and a gripping system opposing the functional body sliding along the cable are designed such as to reduce device's mounting time and to enhance its functionality.

According to an embodiment, there is a cable protecting device for a cable of a marine survey system having a functional body, a gripping system and a closing system. The functional body is configured to oppose cable bending and/or to limit a bending radius of the cable, and includes at least two portions configured to be clamped together to surround the cable. The gripping system is configured to oppose the functional body sliding along the cable. The closing system is configured enable the at least two portions to engage fast and remain clamped.

According to an embodiment, there is a method for deploying a marine survey system that includes providing a cable-protecting device, mounting the cable-protecting device at a location where another cable is attached to the cable, and deploying the cable with the mounted cable-protecting device in water. The cable-protecting device includes a functional body, a gripping system and a closing system. The functional body is configured to oppose cable bending and/or to limit a bending radius of the cable, and includes at least two portions configured to be clamped together to surround the cable. The gripping system is configured to oppose the functional body sliding along the cable. The closing system is configured enable the at least two portions to engage fast and remain clamped.

According to yet another embodiment there is a marine survey system including a vessel that tows survey equipment, cables used to connect the towed survey equipment to the vessel such that to maintain a pre-determined data acquisition geometry while the equipment is towed, and at least one cable-protecting device configured to be mounted on one of the cables at a location where another of the cables is attached. The cable-protecting device includes a functional body, a gripping system and a closing system. The functional body is configured to oppose cable bending and/or to limit a bending radius of the cable, and includes at least two portions configured to be clamped together to surround the cable. The gripping system is configured to oppose the functional body sliding along the cable. The closing system is configured enable the at least two portions to engage fast and remain clamped.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed in the context of marine survey systems. However, similar embodiments and methods may be used for other situation in which cable portions are subjected to high stress likely causing undesirable bending.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Cable-protecting devices according to various embodiments are configured to reduce the mounting time and to provide improved reliability. Such devices include a functional body configured to oppose cable bending and/or to limit a bending radius of the cable. The functional body is made of at least two portions configured to be clamped around the cable. The device has a gripping system configured to oppose the functional body sliding along the cable, and a closing system configured to enable the portions to engage fast and remain clamped.

Figure 4:
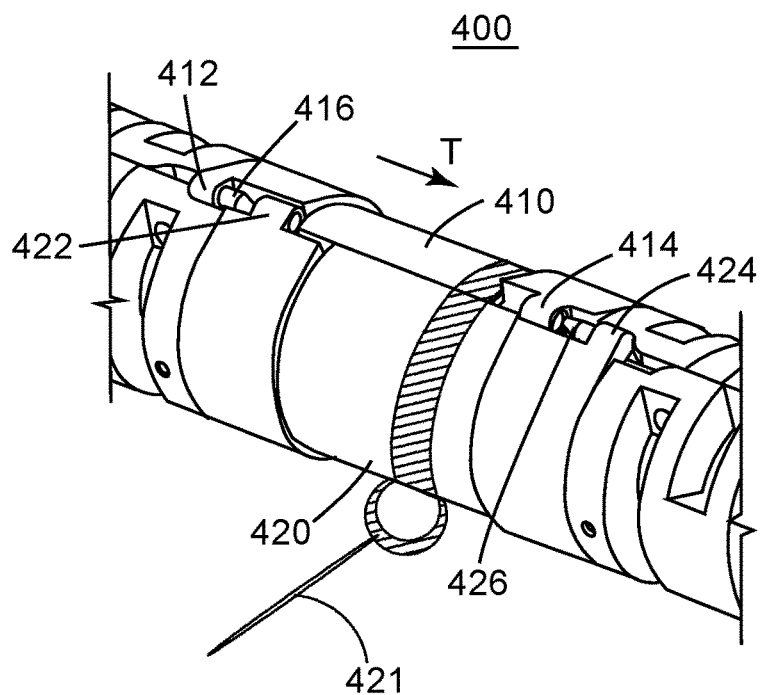
FIG. 4 illustrates a cable-protecting device having a closing system with mating shapes according to an embodiment.

FIG. 4 is a perspective view of a collar 400 made of two half-portions 410 and 420. The collar may be made of a metallic material or hard plastic and is configured to allow another cable 421 to be mounted across the protected cable.

Portion 410 has an L-shaped hook 412 and a hook-receiving loop 414 along a longitudinal edge 416, and portion 420 has a hook-receiving loop 422 and an L-shaped hook 424 along a longitudinal edge 426. The L-shaped hooks and the hook-receiving loops are mating shapes.

The number of hooks and hook-receiving loops is illustrative and not intended to be limiting. For some short (in longitudinal direction) functional bodies, a single pair of mating shapes may suffice, while for longer functional bodies, more than two pairs may be employed. In various embodiments, mating shapes of a first type (e.g., hooks) may be formed on a longitudinal edge and mating shapes of a second type (e.g., hook-receiving loops), complementary to the mating shapes of the first type, may be formed along the other edge.

Portions 410 and 420 engage by a single translation relative to one another as suggested by arrow T. Such a translation makes each of the L-shaped hooks to slip into the corresponding one of the hook-receiving loops.

Figure 5:
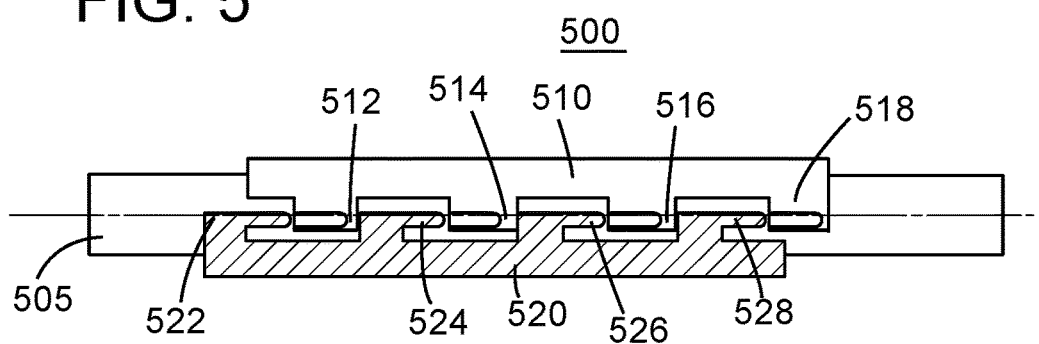
FIGS. 5 and 6 illustrate a cable-protecting device having a closing system with mating shapes according to another embodiment.
Figure 6:
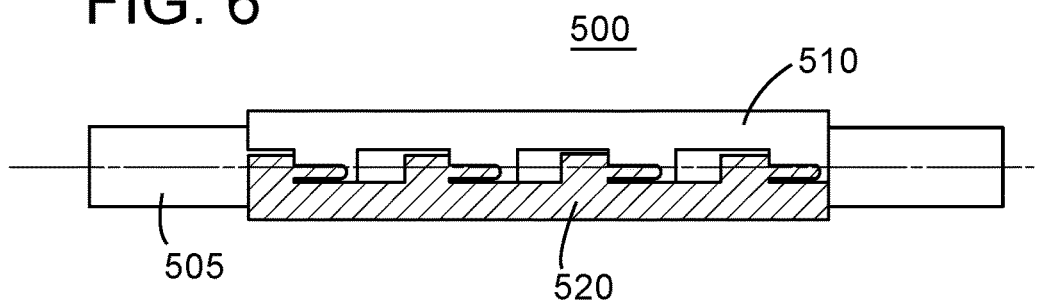

FIGS. 5 and 6 are side views of a cable-protecting device 500 according to another embodiment before (in FIG. 5) and after (FIG. 6) a translation. Device 500 includes two portions 510 and 520 clamped to surround cable 505. Mating shapes 512, 514, 516 and 518 formed along longitudinal edge of part 510, are configured to receive mating shapes 522, 524, 526 and 528 formed along longitudinal edge of portion 520.

Figure 7:
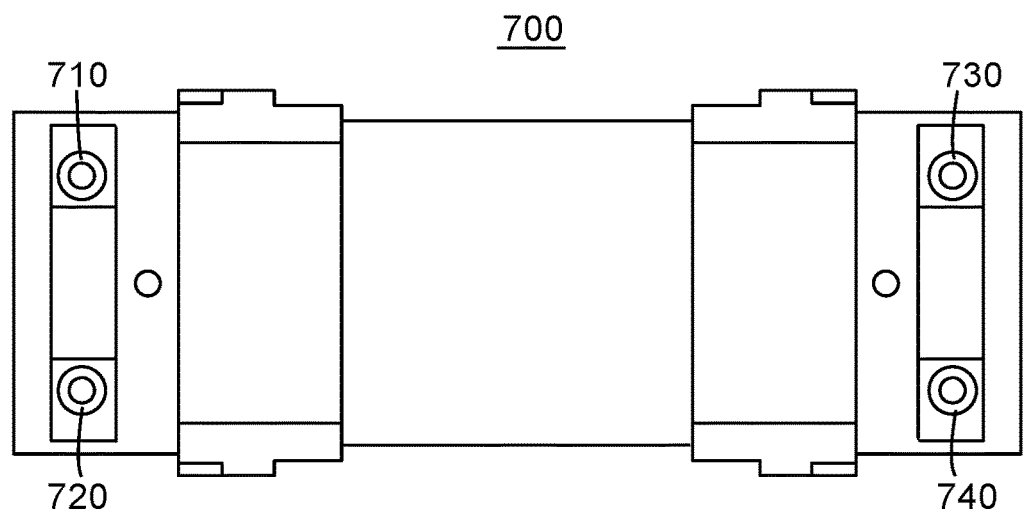
FIG. 7 illustrates a cable-protecting device with a locking mechanism according to an embodiment.

FIG. 7 illustrates a cable-protecting device 700 similar to the one in FIG. 4. Cable-protecting device 700 includes a locking mechanism made of pins 710, 720, 730, 740 (the number and location of these pins is merely illustrative and not intended to be limiting) that pass through the device's two portions. The pins are inserted in holes of the device's two portions, which holes become aligned after the translation. The pins prevent the half-portions to unintentionally reverse the translation and separate.

Figure 8:
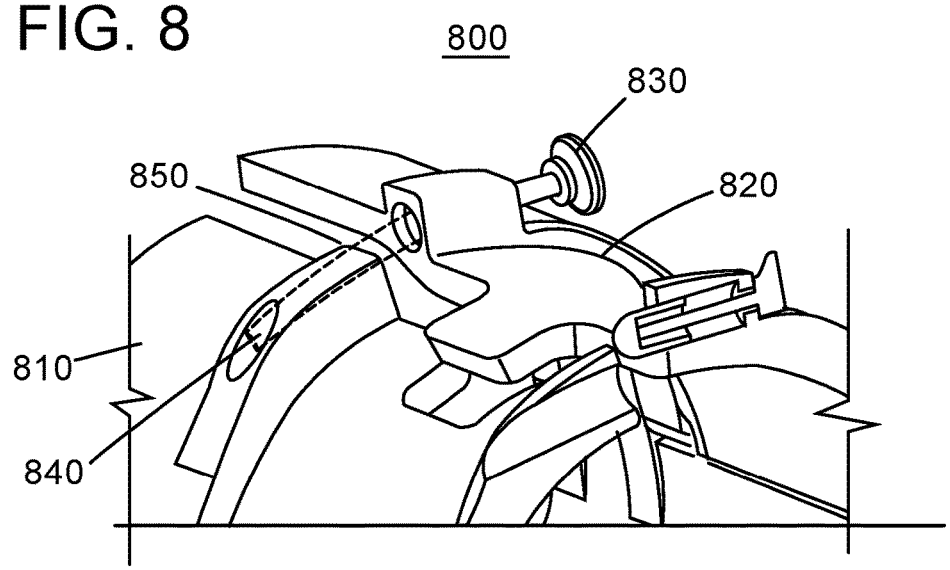
FIG. 8 illustrates a cable-protecting device with a locking mechanism according to another embodiment.

FIG. 8 illustrates a cable-protecting device 800 with a locking mechanism according to another embodiment. Device 800 has half-collar portions 810 and 820, which are locked with pin 830 after being clamped around a cable. Pin 830 attached to portion 820 moves into a hole 840 of portion 810, when the pin, which is biased forward by a spring (not shown), is put in contact with stopper 850. For retrieving the device, a crank (not shown) allows the pin's removal so that the half collars can be separated.

Figure 9:
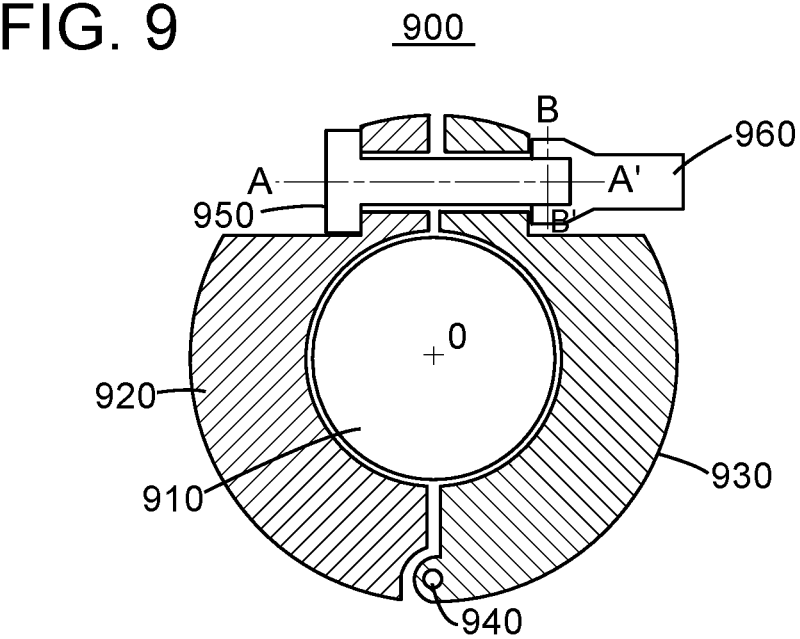
FIGS. 9-12 illustrate a cable-protecting device having a closing system that includes a fastener locked by a cam mechanism, according to another embodiment.
Figure 10:
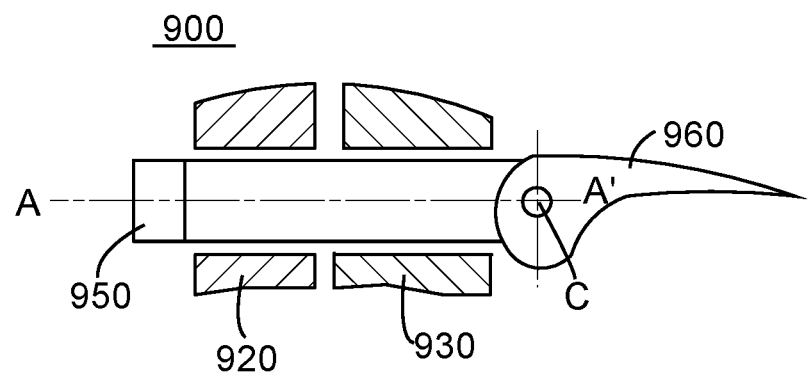
Figure 11:
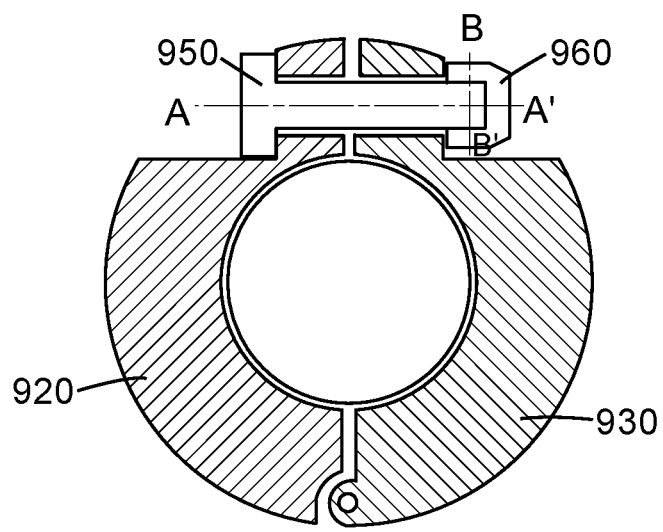
Figure 12:
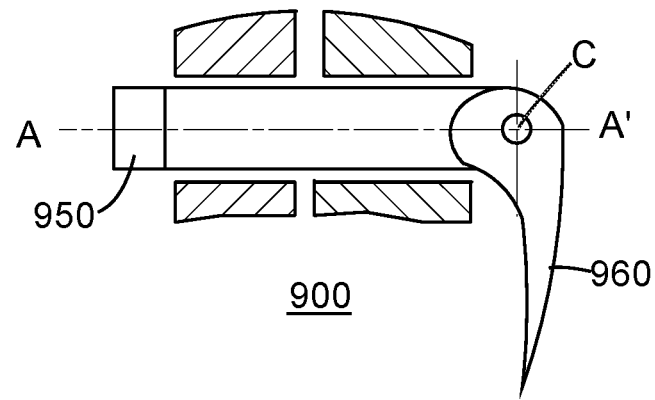

FIGS. 9-12 illustrate a cable-protecting device 900 configured to surround cable 910. FIGS. 9 and 11 are cross-sections perpendicular on a longitudinal axis O, and show that half-portions 920 and 930 of device 900 are connected via hinge 940 on one longitudinal edge and an eccentric cam 960 locking a ¼ turn fastener 950 at the other longitudinal edge. FIGS. 10 and 12 are cross sections substantially parallel to the longitudinal axis and include axis AA' marked in FIGS. 9 and 11. FIGS. 9 and 10 show cable-protecting device 900 before locking the half-portions, and FIGS. 11 and 12 show cable-protecting device 900 after locking.

When device 900 is mounted on cable 910, half-portions 920 and 930 are brought together around the cable to allow ¼ turn fastener 950 (having a T shape at one end and eccentric cam 960 at the other) to pass there-through. The fastener is then rotated 90° (i.e., ¼ turn) around axis AA' so that the T-shape prevents removing it by translation in one direction. Eccentric cam 960 rotates around axis BB' in FIGS. 9 and 11, seen as rotation center C in FIGS. 10 and 12. After this cam rotation, the fastener cannot further translate in the other direction, thereby locking together half-portions 920 and 930.

Figure 13:
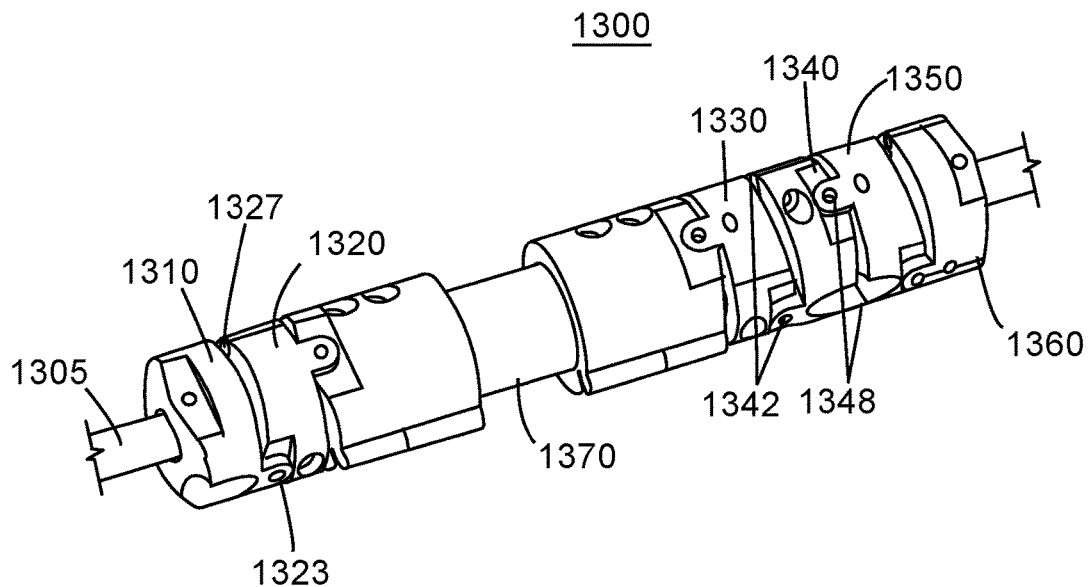
FIG. 13 illustrates a cable-protecting device including plural knuckle bodies according to an embodiment.

FIG. 13 illustrates a cable-protecting device 1300 including plural knuckle bodies 1310, 1320, 1330, 1340, 1350 and 1360 according to an embodiment. Device 1300 also includes a collar 1370. The knuckle bodies and the collar are each made of two (or more) pieces clamping together around cable 1305. The bending radius is limited by the gap between the knuckle bodies. Each knuckle body (e.g., 1320) is connected to an adjacent knuckle body (e.g., 1310) by diametrical pivots (e.g., 1323 and 1327). The diametrical pivot pairs (e.g., 1342 and 1348) on opposite transversal sides of a knuckle body may be formed at ends of diameters that are not parallel to one another. This feature makes a knuckle body to operate together with one adjacent knuckle body to limit radius in one direction, and to operate together with the other adjacent knuckle body to limit bending radius in another direction. The two directions do not coincide, but may be perpendicular to one another.

Figure 14:
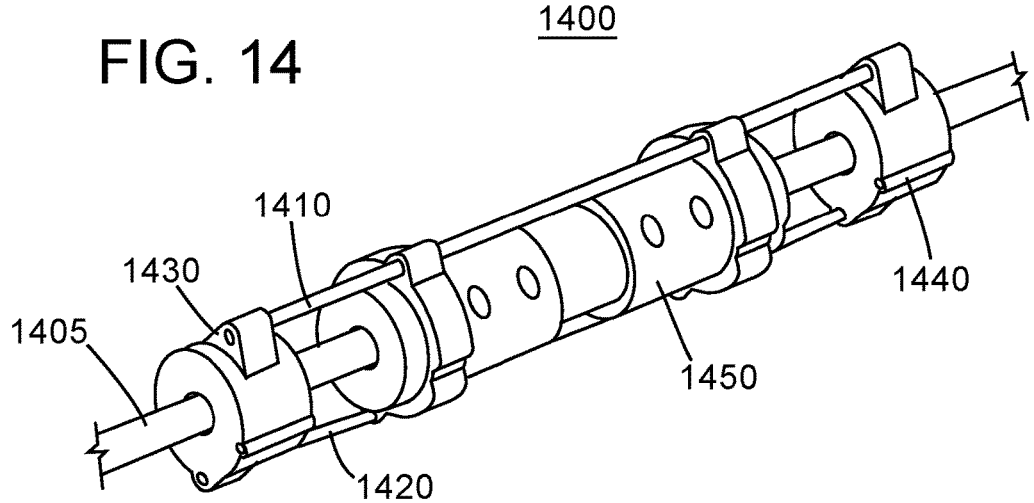
FIG. 14 illustrates a cable-protecting device including diametrical rods, according to an embodiment.

FIG. 14 illustrates a cable-protecting device 1400 including rods 1410 and 1420, according to an embodiment. The rods are arranged diametrically (i.e., their axis are in the same plane as longitudinal axis of cable 1405), and may be supported by end caps 1430 and 1440 and (or instead of end caps).

Figure 15:
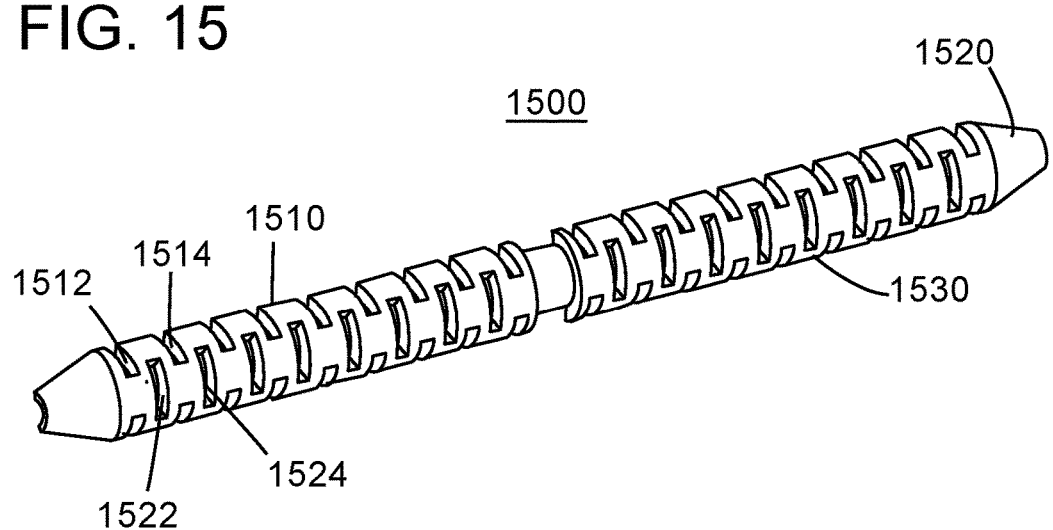
FIG. 15 illustrates a half-portion of a cable-protecting device, according to an embodiment.

FIG. 15 illustrates a half-portion 1500 of a cable-protecting device according to another embodiment. This cable protecting device is elastically deformable and has rows (e.g., 1510, 1520, 1530) of splits. The splits (e.g., 1512, 1514, . . . ) along one row (e.g., 1510) are longitudinally interleaved with the splits along an adjacent row (e.g., 1522, 1524, . . . ). That is, the longitudinal position of split 1522 is between the longitudinal position of split 1512 and the longitudinal position of split 1514; the longitudinal position of split 1514 is between the longitudinal position of split 1522 and the longitudinal position of split 1524. The cable bending radius is limited by the contact between stoppers (i.e., the portions between the splits). In same time, the elastically deformable substance (for example, polyurethane) used to manufacture this cable-protecting device absorbs energy resisting cable bending. The splits are designed to allow body deformation without collapsing and to limit bending radii in different directions.

Figure 16:
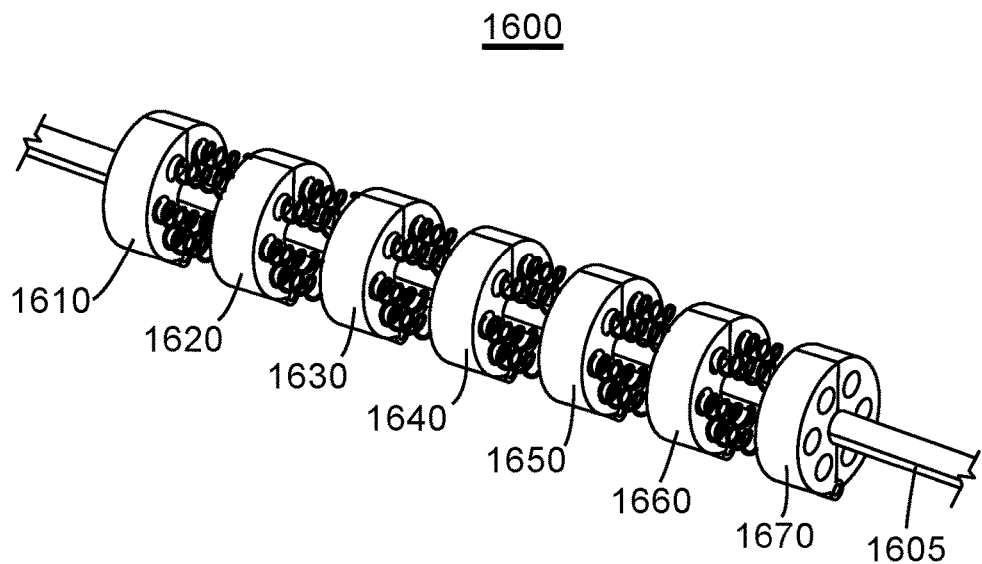
FIG. 16 illustrates a cable-protecting device having springs between stiffener pieces according to an embodiment.

FIG. 16 illustrates a cable-protecting device 1600 having springs between stiffener pieces (e.g., 1610, 1620, . . . 1670) according to an embodiment. The stiffener pieces are each made of two parts clamped together around cable 1605. Springs such as 1615 (only one labeled) oppose variation of distance between the stiffener pieces. Cable cable-protecting device 1600 operates as a bending restrictor due to the stiffener pieces and the gaps there-between (the cable cannot bend more than a radius defined by the stiffener pieces touching one another), and as a bending stiffener due to the springs, which generate an elastic force opposing increasing (on one side) and decreasing (on the other side) of the distance between the stiffener pieces.

In many embodiments, the cable-protecting device also includes a gripping system configured to oppose the functional body sliding along the cable.

Figure 17:
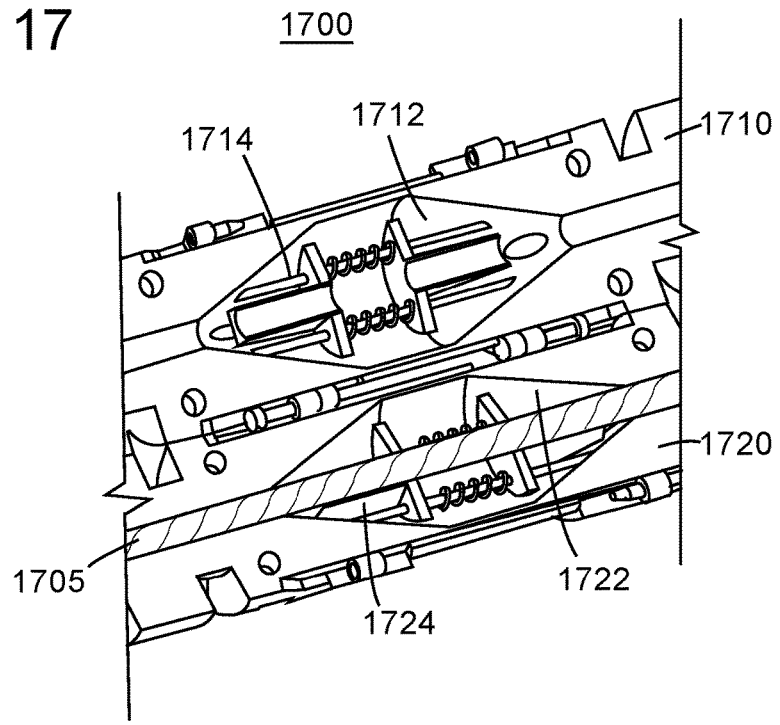
FIGS. 17 and 18 illustrate a cable-protecting device with a gripping system with trunk-conical surfaces according to an embodiment.
Figure 18:
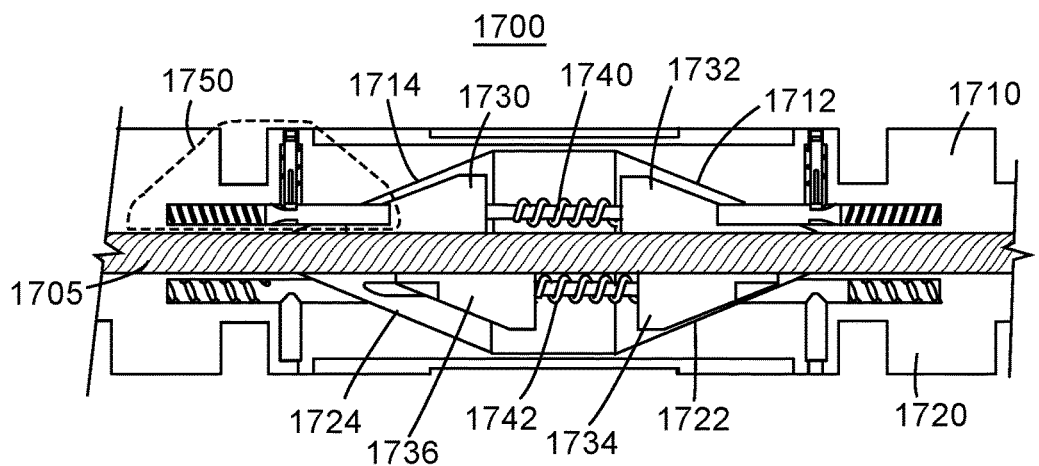

FIGS. 17 and 18 illustrate a cable-protecting device 1700 having a gripping system with trunk-conical surfaces according to an embodiment. Cable-protecting device 1700, which is illustrated in FIG. 17 before being clamped around cable 1705, is made of two portions 1710 and 1720 having trunk-conical surfaces 1712 and 1722, respectively.

FIG. 18 is a cross-section through cable-protecting device 1700 after being mounted on cable 1705. When cable 1705 tends to slide relative to the device's body (i.e., portions 1710 and 1720), at least one of conical wedges 1730, 1732, 1734 and 1736 is pushed against a corresponding portion of the trunk-conical surfaces. The wedges then transfer the contact force as a radial pressure on the cable, thereby increasing friction and, thus, opposing the relative translation. Springs 1740 and 1742 may be mounted between the wedges to bias the wedges toward the trunk-conical surfaces. The gripping system may include wedge-mounting systems (such as in circle 1750) configured to block the conical wedges to facilitate the device's mounting on the cable. The mounting systems release the conical wedges after the device is mounted.

Figure 19:
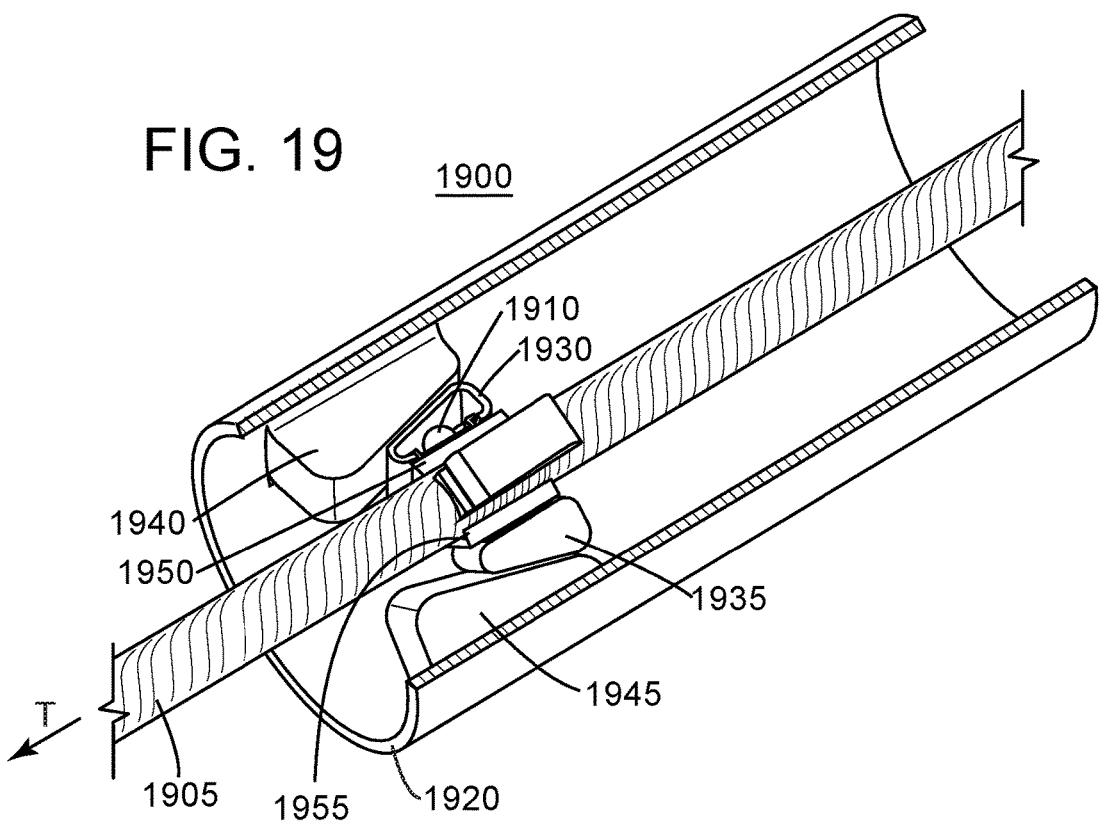
FIG. 19 illustrates a cable-protecting device with a freewheel type of gripping system according to an embodiment.

FIG. 19 illustrates a portion 1900 of a cable-protecting device with a free-wheel type of gripping system according to an embodiment. The gripping system includes several balls such as 1910 positioned around cable 1905 and in contact with device's body 1920 via wedges such as 1930 and 1940, or 1935 and 1945. Pressure on contact areas 1950 and 1955 increases when cable 1905 tends to move in T direction relative to the device's body. A second symmetric gripping system can be mounted in to increase pressure on the cable when the cable tends to move relative to the device's body in the opposite direction.

Figure 20:
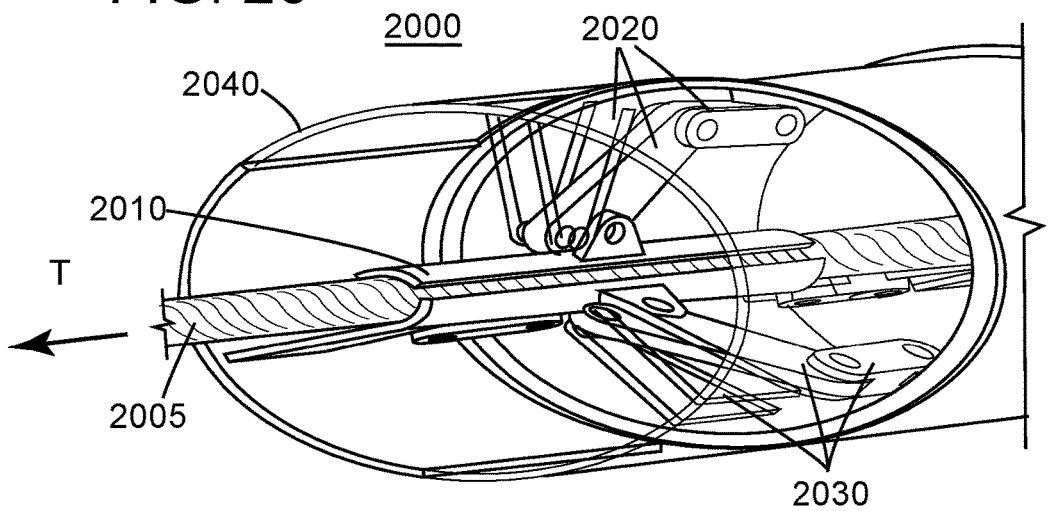
FIG. 20 illustrates a cable-protecting device with a brake type of gripping system according to an embodiment.

FIG. 20 illustrates a cable-protecting device 2000 with a brake type of gripping system according to an embodiment. This gripping system includes contact areas such as 2010 configured to ensure a good grip and a good pressure repartition on cable 2005. Mechanisms such as 2020 and 2030, including at least two arms with pivot or knuckle links, connect the contact areas to device's body 2040. This brake-type gripping system increases pressure on the contact areas when cable 2005 tends to move in T direction relative to the device's body. In some embodiments, springs may be employed to ensure contact and/or to provide an additional pressure on the contact areas. Another gripping system symmetric to the one illustrated in FIG. 20 can be mounted in to increase pressure on the cable when the cable tends to move relative to the device's body in the opposite direction.

Figure 21:
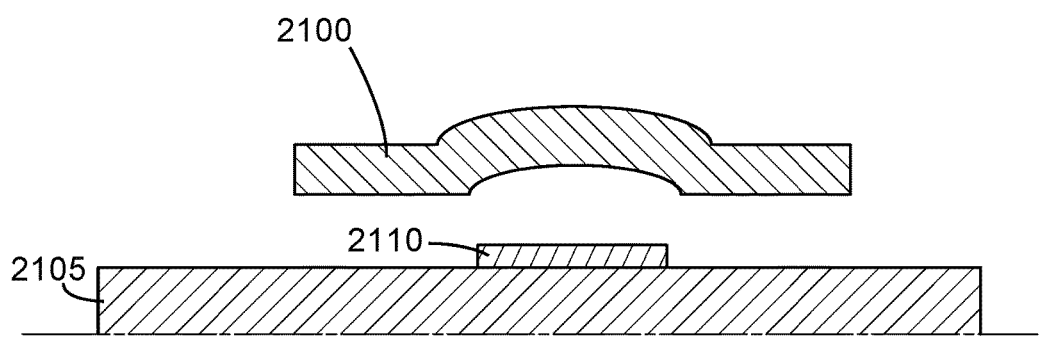
FIGS. 21 and 22 illustrate a cable-protecting device configured to press on a deformable material placed on the cable according to an embodiment.
Figure 22:
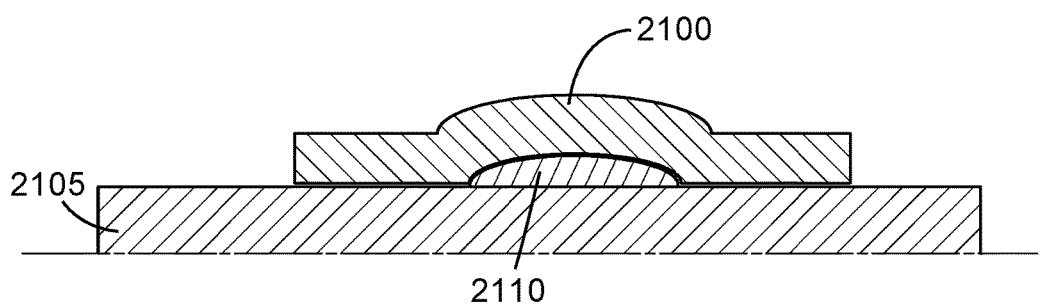

FIGS. 21 and 22 illustrate a cable-protecting device configured to press on a deformable material placed on the cable according to an embodiment. FIG. 21 shows a deformable piece of material 2110 which may be made, for example from rubber, placed on cable 2105, and a portion 2100 of a cable-protecting device before being clamped on the cable. FIG. 22 illustrates portion 2100 over the piece of material 2110 after the cable-protecting device was clamped on cable 2105. The pressure exerted on cable 2105 opposes longitudinal translation of the cable relative to the device in both directions.

Figure 23:
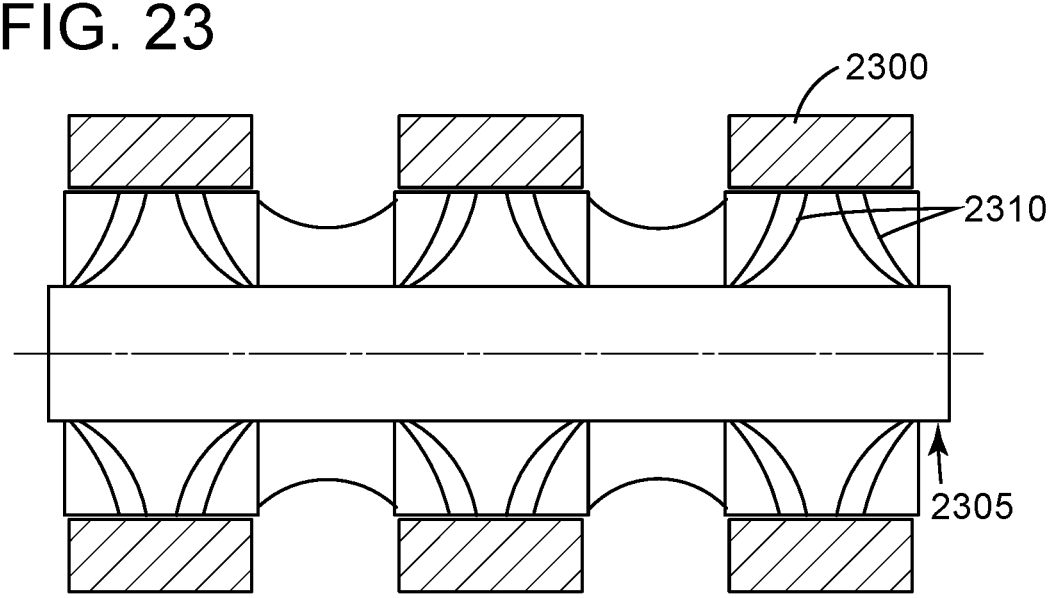
FIG. 23 illustrates a cable-protecting device with a gripping system including lamella according to an embodiment.

FIG. 23 illustrates a cable-protecting device with a gripping system including lamella according to an embodiment. Pairs of lamella 2310 are placed between functional body 2300 (which may be a stiffener piece and/or perform as bending restrictor in combination with the other unlabeled stiffener pieces) and cable 2305. Lamellas 2310 oppose cable sliding relative to the functional body in both directions.

Figure 24:
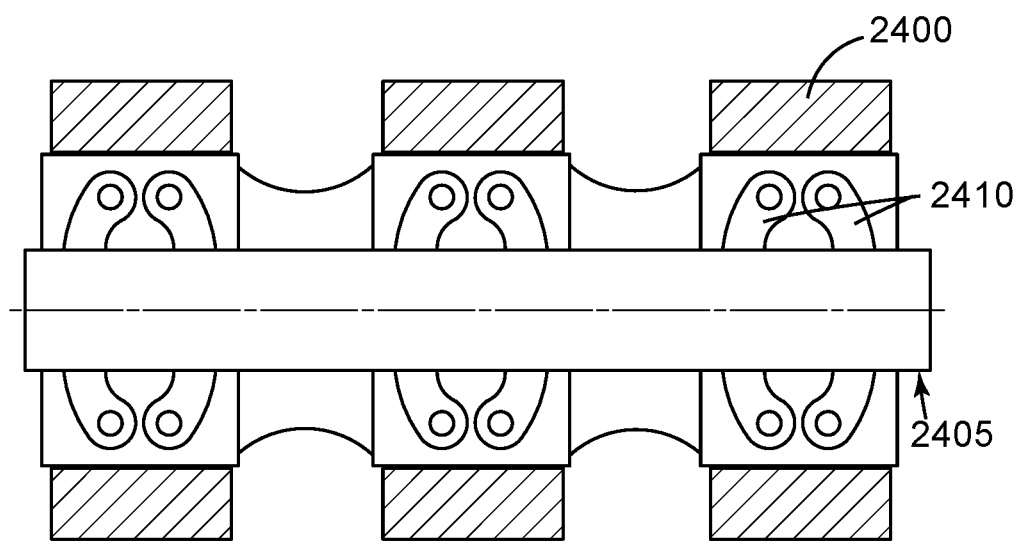
FIG. 24 illustrates a cable-protecting device with a gripping system including cams according to an embodiment.

FIG. 24 then illustrates a cable-protecting device similar to the one in FIG. 23, but using cams instead of lamella, according to an embodiment. Pairs of cams 2410 placed between functional body 2400 and cable 2405 oppose cable sliding relative to the functional body in both directions.

Figure 25:
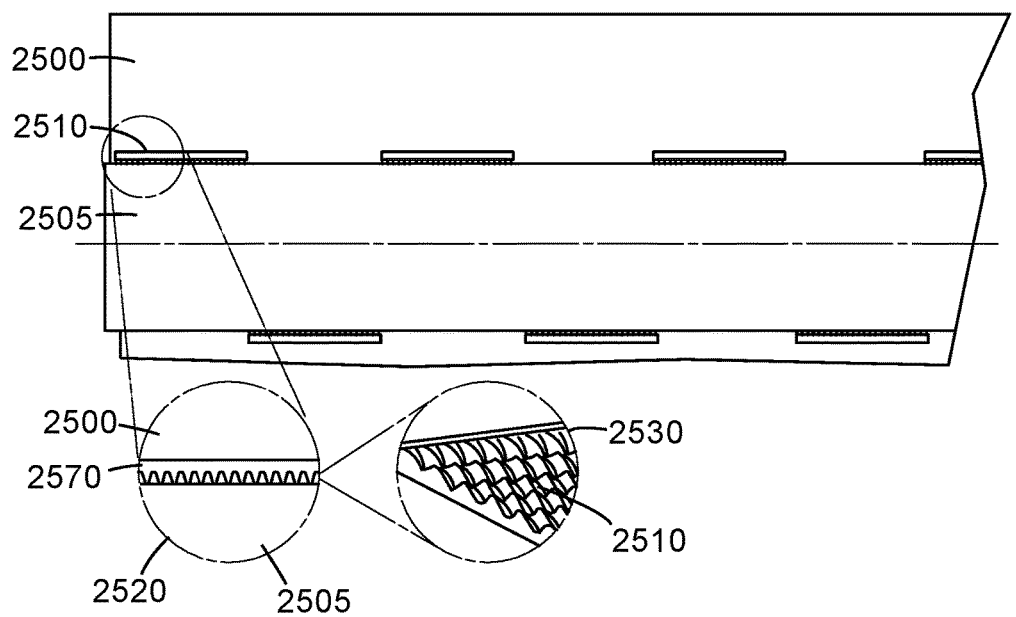
FIGS. 25 illustrates a cable-protecting device with a gripping system using a friction-increasing layer according to an embodiment.

FIG. 25 illustrates a cable-protecting device with a gripping system using a friction-increasing layer 2510 according to an embodiment. Layer 2510 is sandwiched between device's body 2500 and cable 2505 when the device is mounted thereon. Layer 2510 has diamond shapes on one side (as detailed in circle 2520), the side with diamond shapes being in contact with cable 2505 (as shown in circle 2530). The diamond shapes increase friction between cable 2505 and device's body 2500 thereby opposing a relative translation.

Figure 26:
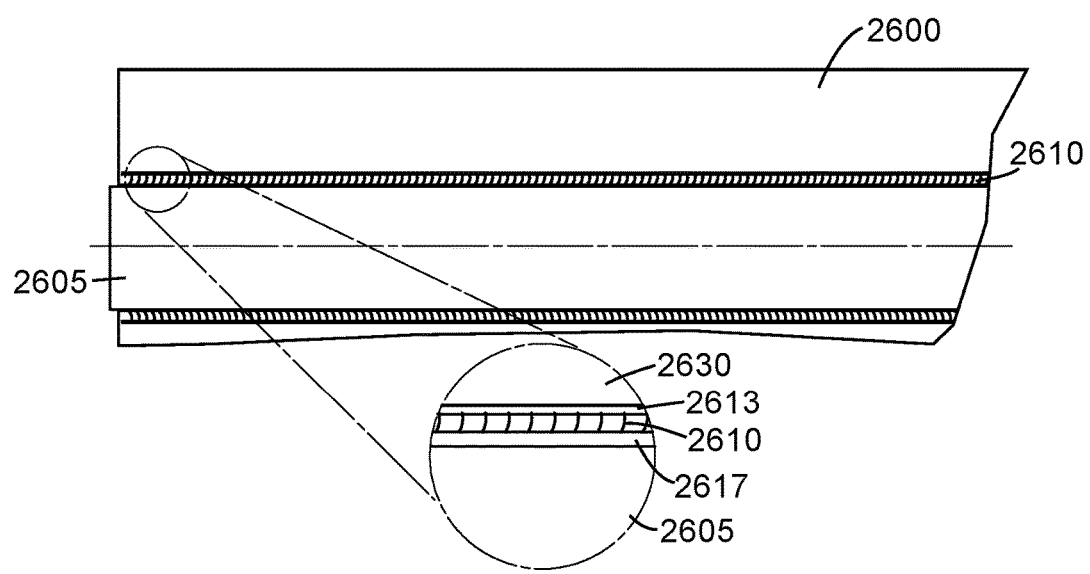
FIG. 26 illustrates a cable-protecting device with a gripping system using a seal-skin type layer according to an embodiment.

FIG. 26 illustrates a cable-protecting device with a gripping system using a sealskin type of layer 2610 according to an embodiment. Structure of layer 2610, which is shown in the circular detail circle 2630, includes face-to-face surfaces 2613 and 2617, which generate high friction opposing any relative motion between cable 2605 and device's body 2600.

FIGS. 27-34 refer to cable-protecting devices including three pieces: a connection clamp and two tapered bend stiffeners, 2710 and 2720. Gripping systems according to various embodiments are illustrated for the clamp, which has different labels in each figure because the gripping systems are different. However, this configuration is an illustration and not intended to be limiting. The illustrated gripping systems may be used for other functional pieces and/or in other configurations.

Figure 27:
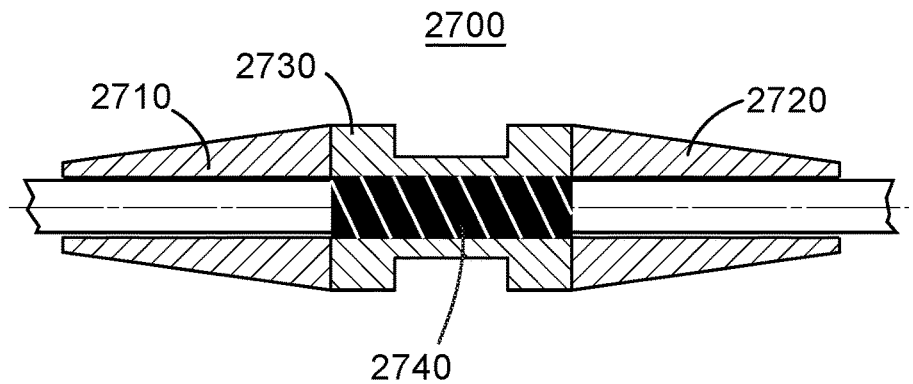
FIG. 27 illustrates a cable-protecting device including a gripping system with an adhesive layer according to an embodiment.

FIG. 27 illustrates a cable-protecting device 2700 including a gripping system with an adhesive layer 2740 according to an embodiment. The adhesive layer between cable 2705 and connection clamp 2730 may be glue, a double side tape with glue on both sides or glue on one side and velcro on the other. In one embodiment, the adhesive layer may result from combining a coating applied on the clamp with one applied on the cable in a cable-contact area.

Figure 28:
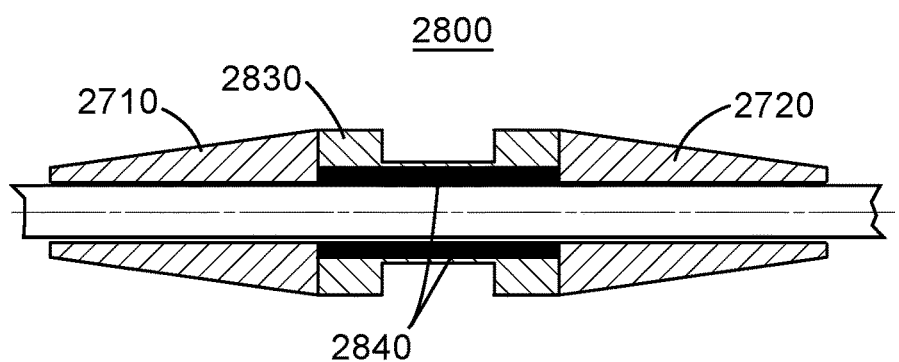
FIG. 28 illustrates a cable-protecting device including a gripping system with a water-dilating layer according to an embodiment.

FIG. 28 illustrates a cable-protecting device 2800 including a gripping system with a water-dilating layer 2840 according to an embodiment. A surface of the connection clamp 2830 may be covered by a substance (polymer) that dilates when in contact with water. The polymer may be applied in a shape that favors water reaching the substance when the cable-protecting device is deployed at sea (for example, water connection channels or winglets can be formed around the substance).

Figure 29:
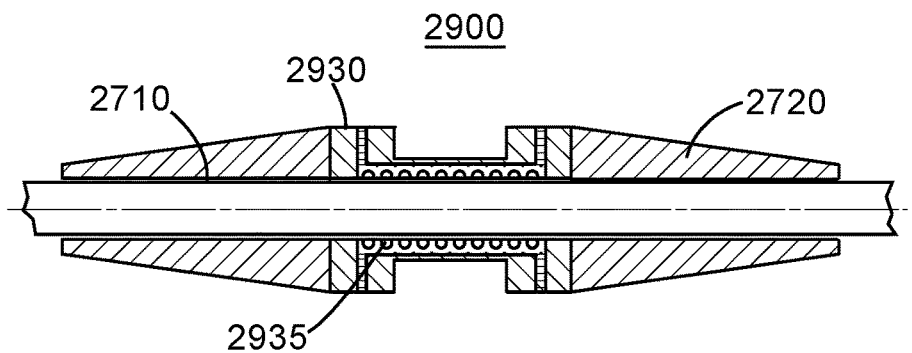
FIG. 29 illustrates a cable-protecting device including a gripping system relying on injecting adhesive substances according to an embodiment.

FIG. 29 illustrates a cable-protecting device 2900 including a gripping system relying on injecting adhesive substances according to an embodiment. Resin, glue or concrete is injected in channels 2935 to form a layer between connection clamp 2930 and cable 2905. The clamp may be made from a material that is easily separated from the injected substance when the device is dismounted. The injected substance on the cable may later be broken by shock or heat.

Figure 30:
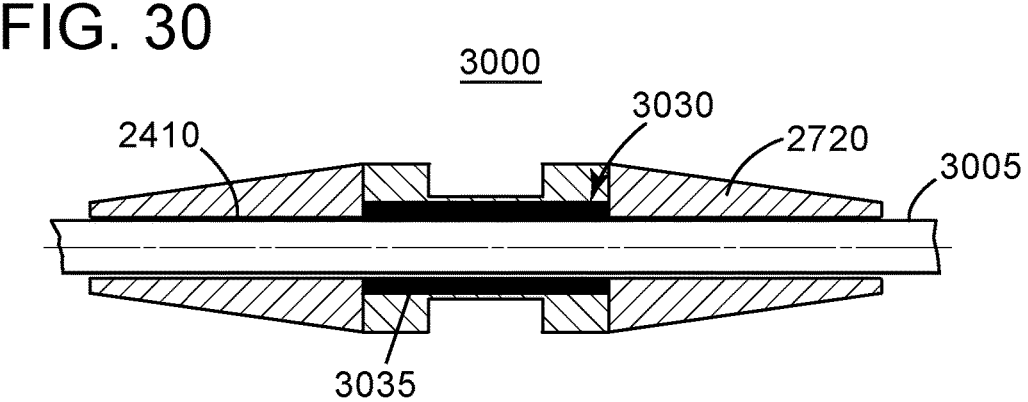
FIG. 30 illustrates a cable-protecting device including a gripping system with a heat-reacting layer according to an embodiment.

FIG. 30 illustrates a cable-protecting device 3000 including a gripping system with a heat-reacting layer 3035 according to an embodiment. Connecting clamp 3030 includes layer 3035 that is made of a heat reactive material such as a polymer, which becomes sticky when heated from an external source. After the device is mounted on cable 3005, heat is applied to melt heat-reacting layer 3035, which will then provide a mechanical and/or chemical grip to the cable's outer surface.

Figure 31:
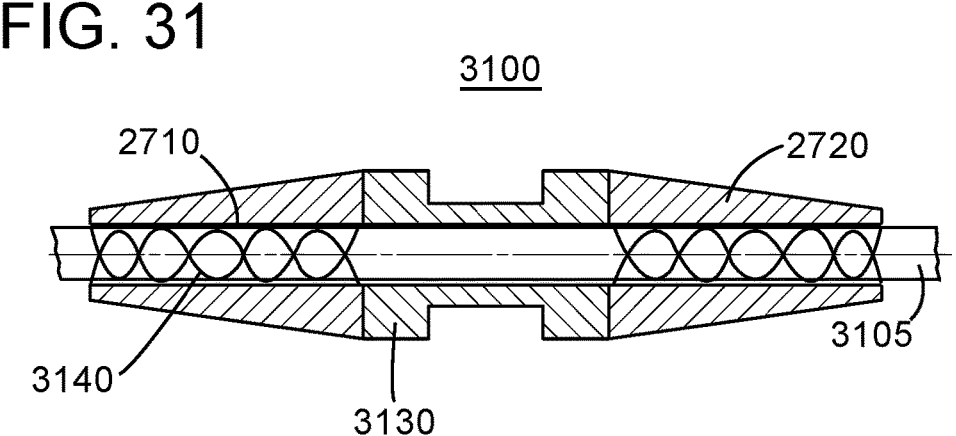
FIG. 31 illustrates a cable-protecting device including a Chinese-fingers antislip system according to an embodiment.
Figure 32:
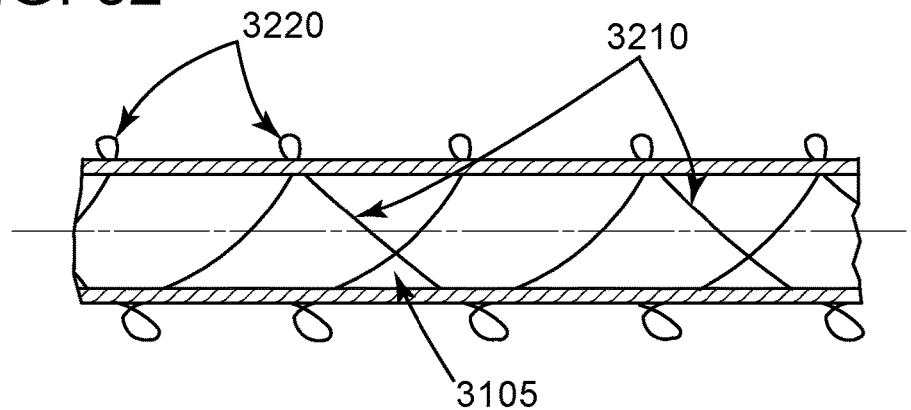
FIG. 32 illustrates a Chinese-fingers braid over a cable.

FIG. 31 illustrates a cable-protecting device 3100 including a Chinese-fingers antislip system 3140 braided over cable 3105 according to an embodiment. As illustrated in detail in FIG. 32, the system is made of extensible rubber or textile strings 3210 (i.e., wires, ropes or straps) crisscrossing the cable's outer surface, tied in locking buckles 3220.

Figure 33:
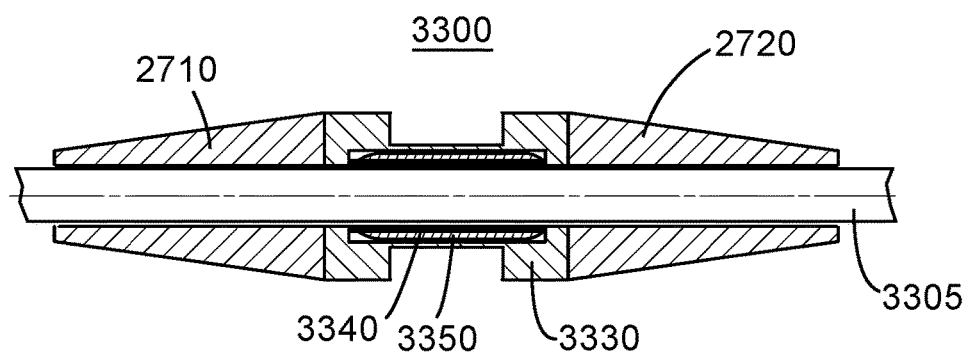
FIG. 33 illustrates a cable-protecting device including a gripping system relying on a hydraulic pressure according to an embodiment.

FIG. 33 illustrates a cable-protecting device 3300 including a gripping system relying on a hydraulic pressure according to an embodiment. One or more pistons such as 3340 are pushed against cable 3305 by a fluid 3350. The fluid is pumped at a high pressure between the piston(s) and clamp 3330, after the device is mounted on the cable, shortly before deploying the cable with the device in water. In one embodiment, a spring system may be added to preserve the pressure.

Figure 34:
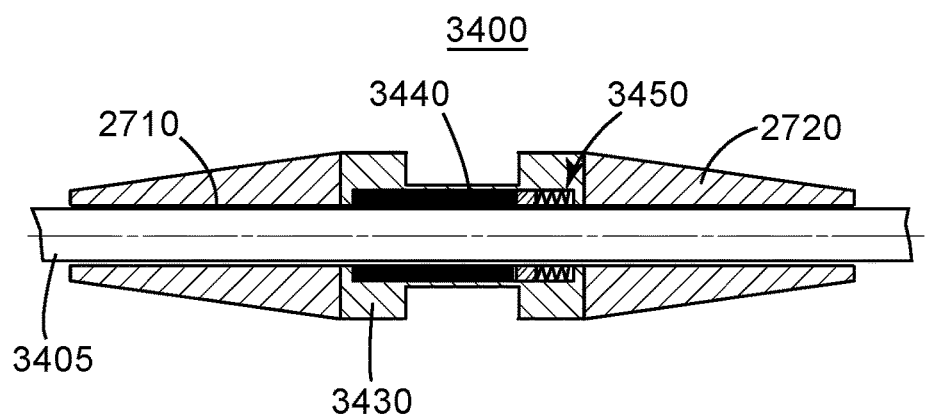
FIG. 34 illustrates a cable-protecting device including a gripping system relying on an elastic pressure according to an embodiment.

FIG. 34 illustrates a cable-protecting device 3400 including a gripping system relying on an elastic pressure according to an embodiment. An incompressible volume of rubber 3440, which is "charged" by being pressed by a high strength spring 3450 (or other mechanical forces), exerts a significant pressure on cable 3405 (thereby opposing slipping there-between).

Figure 1:
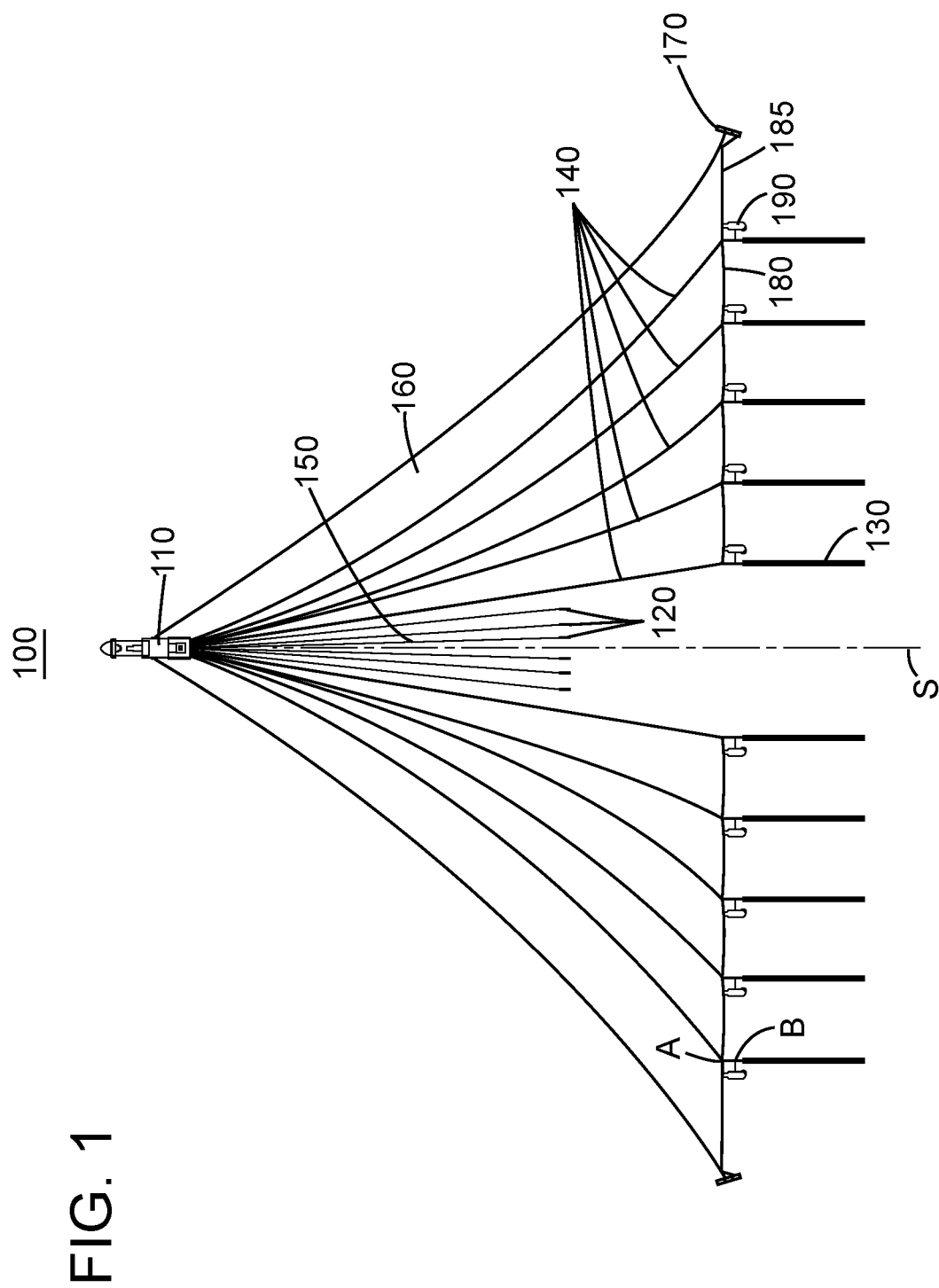
FIG. 1 illustrates a marine survey system.
Figure 2:
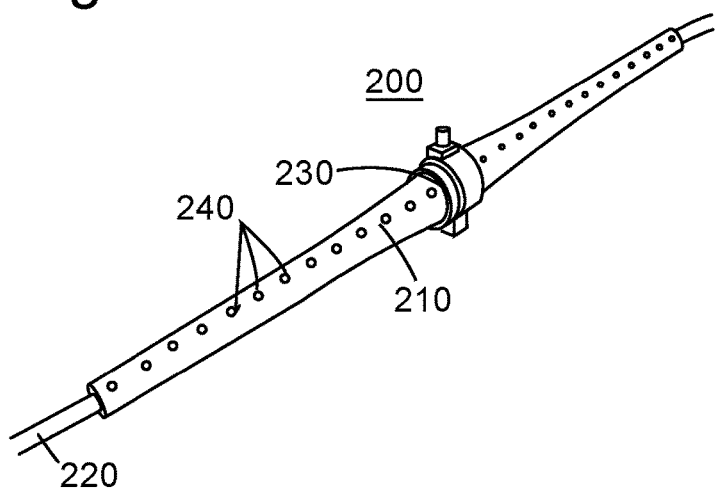
FIG. 2 illustrates a conventional bend stiffener.
Figure 3:
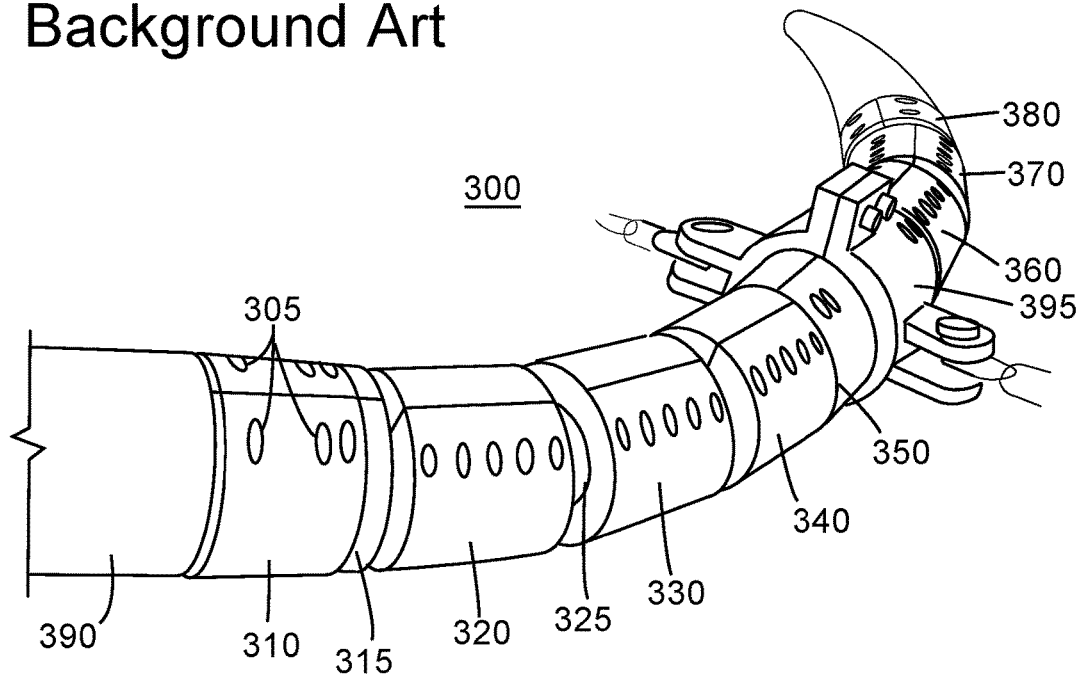
FIG. 3 illustrates a conventional bend restrictor.

According to an embodiment, a marine survey system (which may be similar to the one illustrated in FIG. 1) uses at least one cable-protecting device according to the previously-described embodiments illustrated in FIGS. 4-34.

Figure 35:
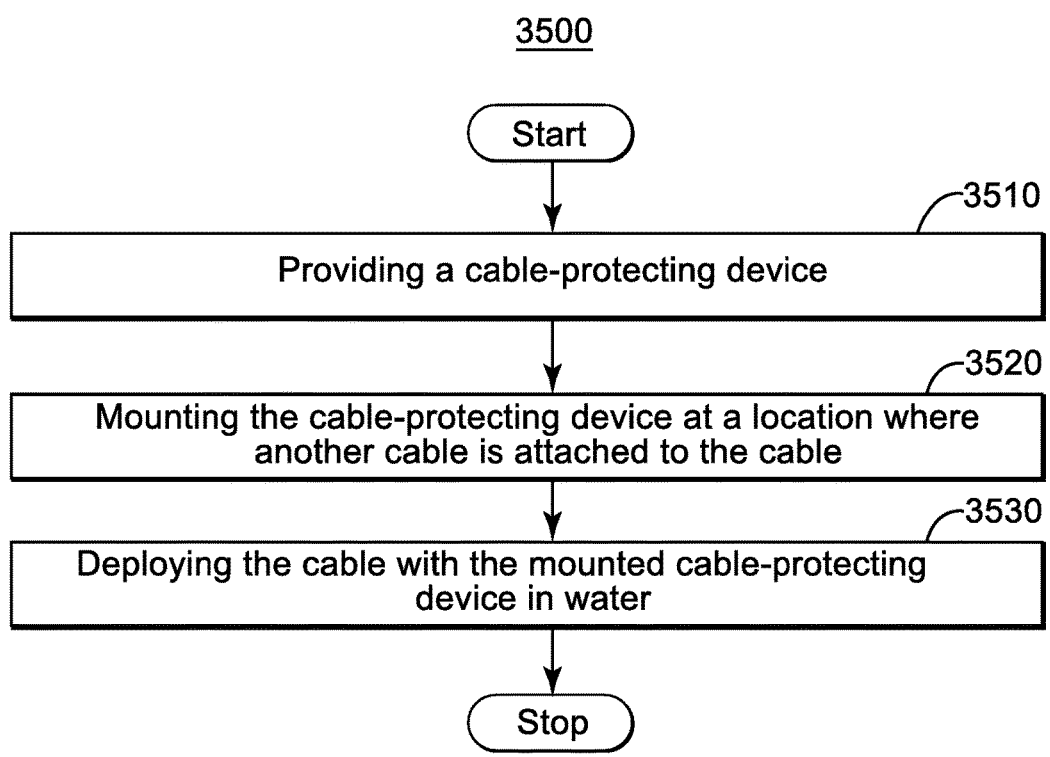
FIG. 35 is a flowchart of a method for deploying a marine survey system according to an embodiment.

FIG. 35 is a flowchart of a method 3500 for deploying a marine survey system according to an embodiment. Method 3500 includes providing a cable-protecting device including a functional body a gripping system and a closing system, at 3510. The cable-protecting device can be any of the previously-described embodiments illustrated in FIGS. 4-34.

Method 3500 further includes mounting the cable-protecting device at a location where another cable is attached to the cable, at 3520, and deploying the cable with the mounted cable-protecting device in water, at 3530. Embodiments of the method may further include one or more of locking the at least two portions, fixedly attaching at least one of the functional body to the cable, generating increased pressure between the functional body and the cable, in a cable-contact area, and connecting at least two of the functional body's segments to one another.

The disclosed exemplary embodiments provide cable-protecting devices configured to be fast on cables of marine survey systems. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A cable-protecting device for a cable of a marine survey system, the device comprising:
    a functional body configured to oppose cable bending and/or to limit a bending radius of the cable, the functional body including at least two portions configured to be clamped together to surround the cable, the at least two portions having corresponding mating elements that engage each other;
    a gripping system attached to an interior of the functional body and configured to oppose the functional body sliding along the cable, wherein the gripping system engages the cable and opposes the sliding of the cable when the cable moves relative to the gripping system; and
    a closing system, different from the mating elements, configured to enable the at least two portions to engage fast and remain clamped.

2. The cable-protecting device of claim 1, wherein the closing system includes a locking mechanism configured to prevent the at least two portions to separate after being clamped together.

3. The cable-protecting device of claim 1, wherein the closing system includes a fastener locked by a cam mechanism.

4. The cable-protecting device of claim 1, wherein the functional body includes knuckle bodies attached to one another along the cable via diametrical pivots so that one of the knuckle bodies is able to rotate relative to a first diameter at one side of the knuckle body, and relative to a second diameter, which is not parallel to the first diameter, at an opposite side of the knuckle body.

5. The cable-protecting device of claim 1, wherein the functional body is elastically deformable and has rows of interleaved splits.

6. The cable-protecting device of claim 1, wherein the functional body includes at least two stiffener pieces with springs there-between.

7. The cable-protecting device of claim 1, wherein the gripping system includes a pair of trunk-conical surfaces formed inside the functional body and matching conical wedges between the trunk-conical surfaces and the cable, arranged to increase pressure between at least one of the conical wedges and the cable when the cable slides relative to the functional body.

8. The cable-protecting device of claim 1, wherein the gripping system is a brake-type system that includes at least two linked arms connected between the functional body and cable-contact areas, such that to increase pressure on cable-contact areas when the cable slides relative to the functional body.

9. The cable-protecting device of claim 1, wherein the gripping system includes one or more pairs of lamella and/or cams placed between the functional body and the cable, the lamella being configured and arranged to oppose translation of the cable relative to the device.

10. The cable-protecting device of claim 1, wherein the gripping system includes an abrasive layer located between the functional body and the cable, the abrasive layer increasing friction between the functional body and the cable.

11. The cable-protecting device of claim 1, wherein the gripping system includes an adhesive layer between an inner surface of the functional body and the cable.

12. The cable-protecting device of claim 1, wherein the gripping system includes a piston pressing against the cable due to pressurized fluid injected between the functional body and the cable.

13. A method for deploying a marine survey system, the method comprising:
    providing a cable-protecting device including
        a functional body configured to oppose cable bending and/or to limit a bending radius of the cable, the functional body including at least two portions configured to be clamped around the cable, the at least two portions having corresponding mating elements that engage each other,
        a gripping system attached to an interior of the functional body and configured to oppose the functional body sliding along the cable, wherein the gripping system engages the cable and opposes the sliding of the cable when the cable moves relative to the gripping system, and a closing system, different from the mating elements, configured to enable the at least two portions to engage fast and remain clamped;

mounting the cable-protecting device at a location where another cable is attached to the cable; and deploying the cable with the mounted cable-protecting device in water.

14. The method of claim 13, further comprising locking the at least two portions after the mounting.

15. The method of claim 13, further comprising fixedly attaching the functional body to the cable.

16. The method of claim 13, further comprising generating an increased pressure between the functional body and the cable, in a cable-contact area.

17. The method of claim 13, wherein the functional body includes functional segments and the mounting further comprises connecting at least two of the functional segments to one another.

18. A marine survey system, comprising:
a vessel that tows survey equipment;
cables used to connect the towed survey equipment to the vessel such that to maintain a pre-determined data acquisition geometry while the equipment is towed; and
at least one cable-protecting device configured to be mounted on one of the cables at a location where another of the cables is attached, the at least one cable-protecting device including:
a functional body configured to oppose cable bending and/or to limit a bending radius of the cable, the functional body including at least two portions configured to be clamped around the cable, the at least two portions having corresponding mating elements that engage each other;
a gripping system attached to an interior of the functional body and configured to oppose the functional body sliding along the cable, wherein the gripping system engages the cable and opposes the sliding of the cable when the cable moves relative to the gripping system; and
a closing system, different from the mating elements, configured to enable the at least two portions to engage fast and remain clamped.

19. The marine survey system of claim 18, wherein the functional body includes knuckle bodies attached to one another along the cable via diametrical pivots so that one of the knuckle bodies is able to rotate relative to a first diameter at one side of the knuckle body, and relative to a second diameter, which is not parallel to the first diameter, at an opposite side of the knuckle body.

* * * * *